United States Patent

[11] 3,570,424

| [72] | Inventor | Jack H. Wigham |
| | | 4206 N.E. 15th St., Amarillo, Tex. 79107 |
| [21] | Appl. No. | 37,495 |
| [22] | Filed | May 21, 1970 |
| [45] | Patented | Mar. 16, 1971 |
| | | Continuation of application Ser. No. 716,740, Mar. 20, 1968, now abandoned. |

[54] POTATO PLANTER
3 Claims, 5 Drawing Figs.

[52] U.S. Cl. .................................................. 111/78, 172/439, 221/185, 221/253
[51] Int. Cl. .................................................. A01c 7/18
[50] Field of Search .......................................... 172/321, 478, 482, 491, 464, 430, 443—448, 451; 280/460.1, 461.1, 406; 111/36, 78, 85; 221/185, 253; 222/177

[56] References Cited
UNITED STATES PATENTS

| 1,034,017 | 7/1912 | Kitchen | 221/185 |
| 1,490,053 | 4/1924 | Willingham et al. | (172/439UX) |
| 2,646,657 | 7/1953 | Robertson | 172/448X |
| 2,684,781 | 7/1954 | Allen et al. | 221/253X |
| 3,024,851 | 3/1962 | Harres | 172/464X |
| 3,039,541 | 6/1962 | Harden et al. | 172/677 |
| 3,077,290 | 2/1963 | Rehder | 222/177X |
| 3,362,361 | 1/1968 | Morrison | 111/85X |

Primary Examiner—Robert E. Bagwill
Assistant Examiner—Alan E. Kopecki
Attorney—Herbert J. Brown ABSTRACT: A tractor mounted three point hitch potato planter that drops the seed close to the bottom of the furrow to prevent its rolling, and which planter is closely hitched with hydraulic lift and can thereby be raised off the ground for tight turns and backing.

Patented March 16, 1971

JACK H. WIGHAM
INVENTOR.

BY *Herbert J. Brown*

ATTORNEY

JACK H. WIGHAM
INVENTOR.

BY Herbert J. Brown

ATTORNEY

POTATO PLANTER

This application is a continuation of application Ser. No. 716,740 filed on Mar. 28, 1968, now abandoned.

This invention relates to tractor mounted potato planters of the type feeding the seed by conveyor chain from a hopper to a furrow dug by the blade of the planter and having a pair of following discs to cover the seed in the furrow.

Previously designed planters of this type have the disadvantage that the seed potatoes drop from considerable height into the furrow, and thus have a tendency to bounce and roll resulting in uneven spacing of the plants in the row. Another disadvantage of existing planters is that they trail by means of a pivoted tongue behind the tractor, and while the blades can be lifted at the end of the furrow, the wheels of the planter remain on the ground, adding considerably to the radius of the turns at the end of the field and resulting in considerable time loss if the planter is to be maneuvered by backing to a fence line.

The present invention provides for a potato planter that is attached to the tractor at three points and very close in, so that it can be backed without jackknifing. The three point attachment also allows the planter to be raised completely off the ground for maneuvering or transportation.

The invention further provides for picking up the seed through the center of the hopper, thus keeping the seed agitated so that every cup on the conveyor is sure to pick up a potato, thus eliminating any chance of skipping in the planted furrow.

Another object of the invention is to provide a planter of the type described that can be preset to plant at a given depth after being lifted for maneuvering or transportation.

These and other objects will become apparent from the following description and the accompanying drawing, in which.

The planter used herein for purposes of description is a two row type, but it can also be used as a one row, four row, six row, etc., planter (not shown) for which provision is made in the standard equipment as hereinafter described.

Figure 1:
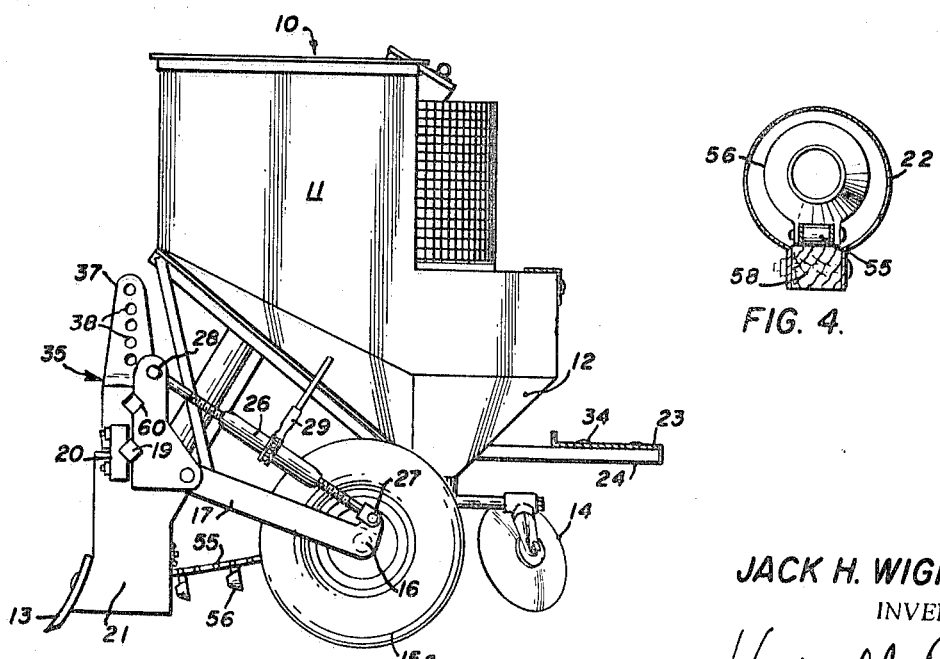
FIG. 1 is a side elevational view of the planter.
Figure 3:
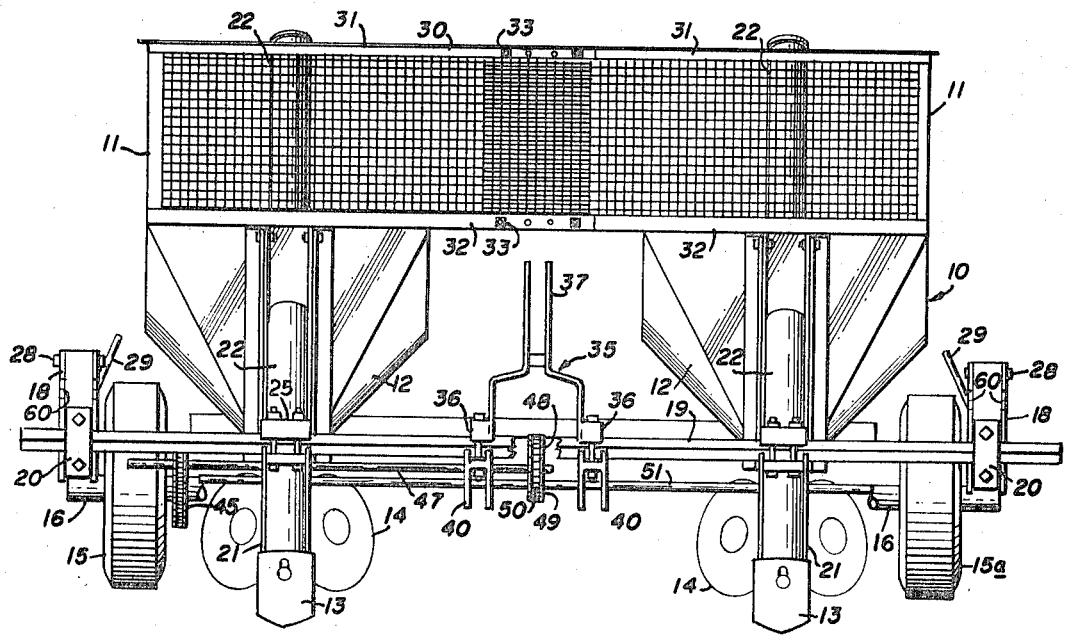
FIG. 3 is a front elevational view of a gang of two planters cut away to show a drive sprocket.

As illustrated in FIGS. 1 and 3, the planter 10 includes a bin 11 for carrying the bulk of the seed which empties by gravity to a hopper 12. A blade 13 on the front of the planter 10 cuts a furrow to a predetermined depth and a pair of adjustable discs 14 return the soil to the furrow after the potatoes are planted.

Bull wheels 15 and 15a on individual axles 16 ride at the ends of rearwardly extending cantilevers 17 which are pivotally attached to a structurally rigid hinge blocks 18 on a heavy square or rectangular crossbar 19, extending the full width of the planter by means of clamps 20. The blade 13 is adjustably attached to a plow unit 21 which forms the lower end of a conveyor tube 22 extending upwardly at an angle through the bin 11.

A running board 23 on brackets 24 extends for the width of the planter on the rear and serves as a structural member as well as a platform from which a rider can observe the operation of the machine or reach into the hoppers if necessary. The plow units 21 are attached to the crossbar 19 by means of clamps 25. A turnbuckle 26 extends from a pivot 27 close to the axle 16 to a pivot 28 in the upper end of the hinge block 18 and can be adjusted in length by means of a reversible ratchet wrench 29 which is a permanent part of the turnbuckle 26. Lengthening the turnbuckle 26 lowers the bull wheel 15, or conversely, raises the plow unit 21 or vice versa, thus making the depth of the furrow completely adjustable.

The front of the bin 11 consists of a screen 30 on frames 31 or 32. In a two row planter, as illustrated, the distance between the separate planter units can be adjusted by loosening the clamps 20 and 25 and sliding the units along the crossbar 19, and by changing the bolts 33 in the screen frames 31 and 32 and the bolts 34 in the running board 23 for which multiple holes (not shown) are provided.

Figure 2:
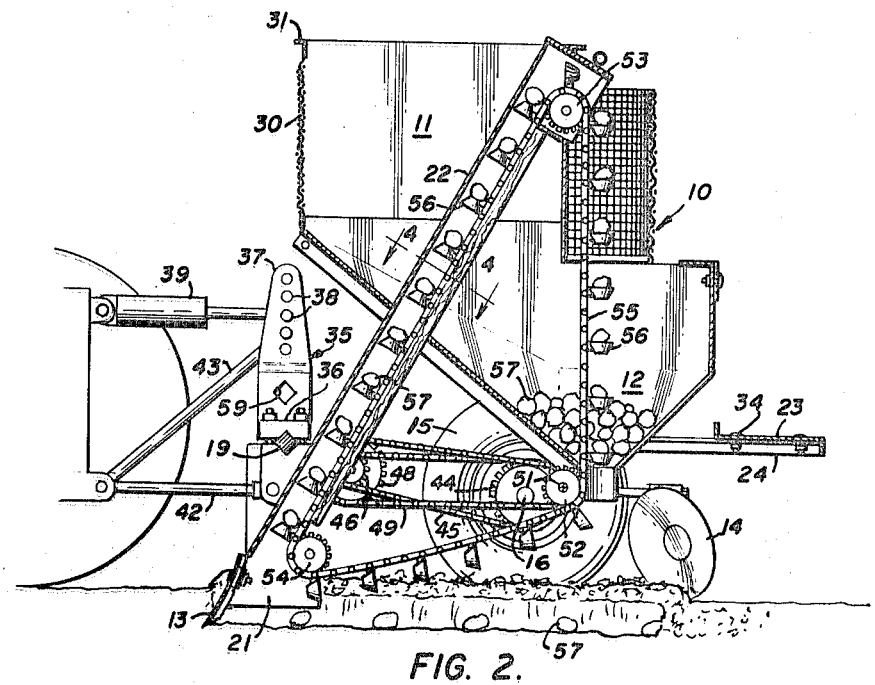
FIG. 2 is a centerline vertical section of the planter showing a typical attachment to a tractor.
Figure 5:
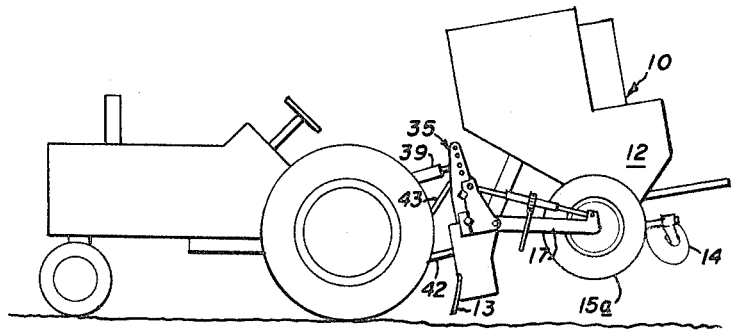
FIG. 5 is a reduced scale side elevational diagram showing the planter raised off of the ground by the hydraulic system of the tractor.

Referring now to FIG. 2, a three point hitch 35 is located at the center of the crossbar 19 and attached thereto by clamps 36. An upwardly extending torque arm 37 contains a series of holes 38 to one of which there is attached a hydraulic top link 39. A pair of depending brackets 40 are provided with holes 41 to which can be attached a tractor hitch 42 which is laterally rigid. A diagonal brace 43 maintains the hitch 42 at the same level thus controlling the depth of the furrow cut by the blade 13. The entire planter can be raised off the ground as shown in FIG. 5 by the hydraulic system of the tractor.

Figure 4:
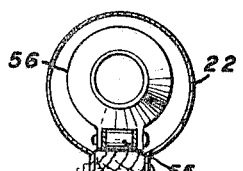
FIG. 4 is an enlarged cross-sectional detail taken along line 4–4 on FIG. 2.

Referring again to FIGS. 2 and 4, the bull wheel 15 is provided with a sprocket 44 which is connected by a chain 45 to a smaller sprocket 46 on a transverse drive shaft 47. The sprocket 46 can be adjusted lengthwise on the shaft 47 by means of a setscrew or spline (not shown) to match the separation of the two planting units. A third sprocket 48 is fixed on the end of the shaft 47 at the centerline between the two units and a chain 49 therefrom drives a sprocket 50 on a second transverse shaft 51 to which conveyor drive sprockets 52 are adjustably attached. An idler sprocket 53 is mounted at the top of the conveyor tube 22 and a second idler sprocket 54 is located at the lower end of the conveyor tube 22. A conveyor chain 55 is threaded through the tube 22 and on the said three sprockets, and in operation the chain rises vertically through the hopper 12 and downward through the tube 22. The conveyor chain 55 is provided with equally spaced cupped rings 56 which pick up seed potatoes 57 in their concave sides on the upward leg of the circuit. As the chain 55 turns over the upper sprocket 53 the potatoes fall onto the backs of the preceding rings 56 and ride down the diagonal leg of the circuit, falling off into the furrow as the chain 55 turns around the lower forward sprocket 54. A hardwood runner 58 is set into the back of the conveyor tube 22 to carry the weight of the chain 55 on its downward leg. If it is desired to combine two of the two row planters herein described to make a four row rig, an additional square or rectangular crossbar (not shown) exactly like the crossbar 19 but twice as long, is inserted in the square holes 59 in the torque arm 37 of the center hitch 35. A double length crossbar (not shown) is substituted for the crossbar 19. Notches 60 are provided in the hinge blocks 18 for the second crossbar so that it can be secured with clamps similar to the first crossbar clamps 20. The center hitch 35 is located midway between the two two-row units comprising the four row rig.

The invention is not limited to the exemplary construction herein shown and described, but may be made in various ways within the scope of the appended claims.

I claim:

1. In a potato planter for attachment to a tractor having a rearwardly extending vertically hinged three way hitch, said potato planter being of the conveyor chain delivery type having an upwardly and rearwardly slanting conveyor tube, a plow unit mounted on the planter at the bottom thereof and in front of said tube, upper and lower idler sprockets adjacent the top and bottom of said tube, a first drive sprocket on a transverse shaft outwardly of said tube and beneath the upper said idler sprocket, a conveyor chain on said sprockets and including a portion thereof extending through the length of said tube, a hopper surrounding the upper rear portion of said chain outwardly of said tube, a transverse bar rigidly mounted on the front of said planter and extending substantially across the width thereof, means connecting said bar with the rearwardly extending end of said three way hitch, at least one hinge block clamped on said boar, a lever extending rearwardly from said hinge block, a bull wheel on the extending end of said lever, a second drive sprocket driven by said bull wheel, a driven sprocket on said shaft and a drive chain connecting the last said drive sprocket with the last said driven sprocket.

2. In a potato planter as defined in claim 1, the construction wherein said hitch unit includes a pair of spaced depending brackets mounted on said crossbar, a torque arm extending thereabove, a tractor hitch connected with each said depending bracket, at least one diagonal brace between the extending end of a said hitch and said torque arm, a hydraulic cylinder connected at one end with said torque arm above said crossbar and means pivotally connecting the extending ends of said hitch and said cylinder with a tractor.

3. In a potato planter as defined in claim 1, the construction including a turnbuckle pivotally connected between said hinge block and the extending end of said lever.